(12) United States Patent
He (10) Patent No.: US 11,482,122 B2
(45) Date of Patent: Oct. 25, 2022

(54) METHODS AND SYSTEMS FOR MONITORING A FAULT CONDITION OF A RADAR ALTITUDE DEVICE

(71) Applicant: HONEYWELL INTERNATIONAL INC., Morris Plains, NJ (US)

(72) Inventor: Gang He, Morristown, NJ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 228 days.

(21) Appl. No.: 16/781,449

(22) Filed: Feb. 4, 2020

(65) Prior Publication Data

US 2022/0299600 A1    Sep. 22, 2022

(51) Int. Cl.
*G08G 5/00* (2006.01)
*G01C 5/00* (2006.01)
*G08G 5/02* (2006.01)

(52) U.S. Cl.
CPC .......... *G08G 5/0086* (2013.01); *G01C 5/005* (2013.01); *G08G 5/0021* (2013.01); *G08G 5/0052* (2013.01); *G08G 5/0065* (2013.01); *G08G 5/025* (2013.01)

(58) Field of Classification Search
CPC .. G08G 5/0086; G08G 5/0021; G08G 5/0052; G08G 5/0065; G08G 5/025; G01C 5/005
See application file for complete search history.

(56) References Cited

U.S. PATENT DOCUMENTS

| | | | |
|---|---|---|---|
| 4,894,659 A * | 1/1990 | Andrews | G01S 7/2922 342/121 |
| 6,233,522 B1 | 5/2001 | Morici | |
| 6,281,832 B1 | 8/2001 | McElreath | |
| 6,507,289 B1 | 1/2003 | Johnson et al. | |
| 6,757,624 B1 | 6/2004 | Hwang et al. | |
| 6,782,312 B2 * | 8/2004 | He | G01C 23/00 701/8 |
| 6,885,334 B1 | 4/2005 | Hager et al. | |
| 8,755,954 B1 | 6/2014 | McCusker et al. | |
| 10,422,872 B2 | 9/2019 | Dunik et al. | |
| 10,459,085 B1 * | 10/2019 | Bell | G01S 19/40 |
| 10,850,868 B1 * | 12/2020 | Habboub | G07C 5/0841 |
| 2001/0047230 A1 * | 11/2001 | Gremmert | G01C 5/005 701/4 |

(Continued)

FOREIGN PATENT DOCUMENTS

CN      106601032 B      8/2018

*Primary Examiner* — Aniss Chad
*Assistant Examiner* — Madison R Hughes
(74) *Attorney, Agent, or Firm* — Lorenz & Kopf, LLP (57) ABSTRACT

Systems and methods are disclosed that include fault monitoring for a radar altitude device. Fault monitoring is performed by receiving first altitude data from the radar altitude device, receiving second altitude data from a second altitude measuring device, receiving terrain data from a terrain database, determining a fault condition threshold adaptively based on the terrain data, determining whether the radar altitude device is exhibiting a fault condition based on the first and second altitude data and the fault condition threshold, and outputting an indication of the fault condition based on the determination of whether the radar altitude device is exhibiting the fault condition.

14 Claims, 3 Drawing Sheets

(56) References Cited

U.S. PATENT DOCUMENTS

| | | | |
|---|---|---|---|
| 2002/0126041 A1* | 9/2002 | Hedrick | G01C 5/005 |
| | | | 342/120 |
| 2002/0188386 A1 | 12/2002 | Day | |
| 2005/0182530 A1* | 8/2005 | Murphy | G01C 23/00 |
| | | | 701/16 |
| 2014/0172202 A1 | 6/2014 | Greene | |
| 2018/0330557 A1* | 11/2018 | Rivera | G05B 23/0245 |
| 2020/0393593 A1* | 12/2020 | Qian | G06K 9/6256 |

* cited by examiner

METHODS AND SYSTEMS FOR MONITORING A FAULT CONDITION OF A RADAR ALTITUDE DEVICE

TECHNICAL FIELD

The present disclosure generally relates to fault monitoring of a radar altitude device and associated systems and methods. The present disclosure more particularly relates to providing an indication of a fault condition of the radar altitude device to one or more aircraft cockpit systems.

BACKGROUND

A radio altimeter (or radar altitude device) uses radar to track the position of an aircraft with respect to the ground. The radio altimeter determines the altitude of the aircraft by reflecting radio waves from the ground.

Aircraft generally use a radar altitude measuring device as an input to one of a multitude of aircraft systems including autopilot systems, flight management systems, display systems such as synthetic vision systems, and Terrain Avoidance and Warning Systems (TAWS). A TAWS alerts an aircraft's flight crew to undesirable conditions due to the position of the aircraft with respect to the terrain along its flight path. TAWS is designed to generate warnings if an aircraft enters a flight path to the ground that could lead to an undesired situation. Such situations could result from an excessive descent rate, an excessive terrain closure rate, loss of altitude after takeoff, insufficient terrain clearance when not in a landing configuration or descent below the instrument landing system (ILS) glide-slope. The TAWS uses inputs from systems that provide indications of radio altitude, aircraft position, airspeed/Mach number, landing gear and flap position and decision height (DH) setting. In situations where an aircraft is deemed too close to the ground, the TAWS system issues an audible and/or visual alarm. In response, the flight crew immediately changes the flight path of the aircraft.

Display systems may also use altitude data measured from a radar altitude device to allow relative height between terrain and ownship aircraft to be visualized, particularly in synthetic vision systems. In one known incident, a radar altimeter malfunctioned with a faulty output but a valid flag, causing significant issues with a synthetic vision display. In such a scenario, it is possible for a runway to appear to rise up towards the aircraft reference symbol on a primary flight display. This may cause confusion or spatial disorientation during an event, particularly at night or in low visibility environmental conditions. Typically, radar altimeters offer higher accuracy when near ground for providing an accurate relative standoff view for synthetic vision system displays in relation to the actual terrain underneath. Given this intended function, monitoring of the output status of a radar altimeter is important for reliable synthetic vision system displays that avoid significant display artifacts as a result of erroneous altitude data, particularly at the critical take-off and landing phase of an aircraft.

Accordingly, it is desirable to effectively monitor fault conditions exhibited by radar altitude devices. In addition, it is desirable to reduce probability of synthetic vision systems, TAWS and other systems relying on faulty altitude data from the radar altitude device. Furthermore, it is desirable to perform such fault monitoring in a way that does not result in nuisance flagging of fault conditions. Furthermore, other desirable features and characteristics will become apparent from the subsequent detailed description and the appended claims, taken in conjunction with the accompanying drawings and the foregoing technical field and background.

BRIEF SUMMARY

Systems and methods described herein include a fault monitoring system for monitoring a fault condition of a radar altitude device. First altitude data is received from the radar altitude device. Second altitude data is received from a second altitude measuring device. Terrain data is received from a terrain database. A fault condition threshold is adaptively determined based on the terrain data. A determination is made as to whether the radar altitude device is exhibiting a fault condition based on the first and second altitude data and the fault condition threshold. An indication of the fault condition is output based on the determination of whether the radar altitude device is exhibiting the fault condition This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and/or modules, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components and modules shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments or programming instructions are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Systems and methods described herein provide fault monitoring for radar altitude measurement devices. An adaptive threshold approach is used to detect radar altitude offset fault and rapid output drop/ramping fault. In an exemplary embodiment of systems and methods described herein, radar altitude values from a radar altitude measuring device are augmented with terrain elevation data derived from a terrain database. The radar altitude values are compared to altitude values from a second, independent, altitude measuring device to provide a measurement of current quality of the radar altitude values. An example of the second, independent, altitude measuring device is Global Positioning System (GPS) or Wide Area Augmentation System (WAAS) altitude measuring device. A fault condition threshold is determined adaptively according to terrain data from a terrain database. The fault condition threshold is a threshold demarking when a fault condition flag is issued representing mis-tracking or failure of radar altitude values with respect to the reference independent altitude values. The fault condition threshold is adjusted according to the terrain profiles for a selected approach. If terrain elevation experiences large terrain variations along an approach path, the fault condition threshold for radar altitude fault flagging may be adjusted to account for possible inaccuracies of terrain data. The fault condition threshold may be reduced where the terrain elevation variations are lower. In some embodiments, fault monitoring takes place more regularly to compare radar-based altitude values with inertial or GPS altitude or other means of present altitude values when close to a landing approach. For example, the present altitude values may also be determined or corrected by ground based guidance signal such as instrument landing systems. When radar altitude derived present altitude values differ from inertial or GPS altitude by an amount greater than the fault condition threshold, a fault flag is issued. Various systems may be responsive to the fault flag. In one embodiment, radar altitude input into display scene positioning of a display system is removed. The fault monitoring systems and methods described herein may be executed by a software module included in a synthetic vision display system.

Figure 1:
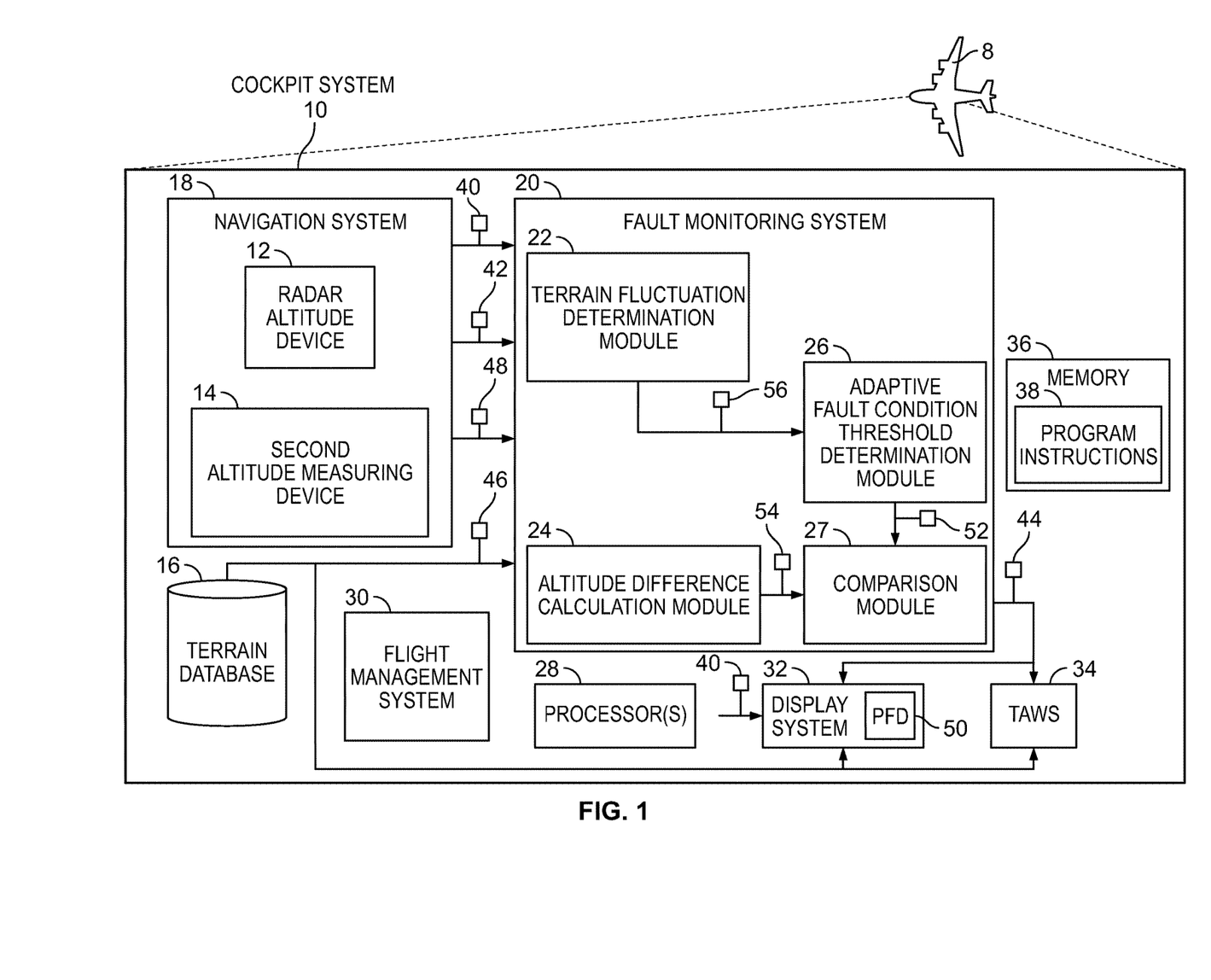
FIG. 1 illustrates a block diagram of a cockpit system including a fault monitoring system, in accordance with various exemplary embodiments.

FIG. 1 illustrates a block diagram of a cockpit system 10 including a fault monitoring system 20, in accordance with various exemplary embodiments. Cockpit system 10 includes a navigation system 18, a terrain database 16, a flight management system 30, a fault monitoring system 20, one or more processors 28, memory 36, display system 32 and a terrain awareness and warning system (TAWS) 34. In accordance with the present disclosure, one or more processors 28 are configured to execute computer program instructions 38 stored on memory 36 (non-transitory and processor-readable data storage medium). The program instructions 38 are configured to cause the one or more processors 28 to receive first altitude data from a radar altitude device of navigation system 18, second altitude data 42 from a second, independent, altitude measuring device 14 of navigation system and terrain data 46 from terrain database 16. One or more processors 28 are configured, by program instructions 38, to determine a fault condition threshold 52 adaptively based on the terrain data in adaptive fault condition threshold determination module 26 of fault monitoring system 20. Further, program instructions 38 implement comparison module 27 of fault monitoring system 20 to determine whether radar altitude device 12 is exhibiting a fault condition based on a comparison of a difference between altitude values of the first and second altitude data and the fault condition threshold 52. Fault monitoring system is configured to output an indication (or flag) 44 of the fault condition based on the determination of whether the radar altitude device is exhibiting the fault condition. Flag 44 may be provided to any sub-system of cockpit system 10 that relies on radar altitude data 40 such as display system 32 and TAWS 34. A sub-system of cockpit system 10 is configured to react to the flag 44 to reduce or eliminate its reliance on radar altitude data 40, in some embodiments. It should be appreciated that although processors 28 and memory 36 (including program instructions 38) are illustrated as being external to the fault monitoring system 20, this configuration is figurative. Computer readable memory 36 and one or more processors 28 may be distributed in various ways through cockpit system 10.

In an exemplary embodiment, navigation system 18 is configured to obtain one or more navigational parameters associated with operation of an aircraft 8. Navigation system 18 may include a global positioning system (GPS), inertial reference system (IRS) and/or a radio-based navigation system (e.g., VHF omni-directional radio range (VOR) or long range aid to navigation (LORAN), ILS or Instrument Landing System with localizer and glide slope signals), and may include one or more navigational radios or other sensors suitably configured to support operation of the navigation system 18, as will be appreciated in the art. In an exemplary embodiment, navigation system 18 is capable of obtaining and/or determining the current location of the aircraft (e.g., with reference to a standardized geographical coordinate system), the heading of the aircraft (i.e., the direction the aircraft is traveling in relative to some reference) and the speed of the aircraft based on various aircraft sensors and providing these navigational parameters (as aircraft data 48) to other systems including fault monitoring system 20 and flight management system 30. In exemplary embodiments of the present disclosure, navigation system 18 includes radar altitude device 12 for providing radar altitude data 40 and second altitude measuring device 14 for providing second altitude data 42. Radar altitude measuring device 12, or radio altimeter, measures altitude of aircraft 8 above terrain presently beneath aircraft 8 based on time taken for a beam of radio waves to travel to ground, reflect, and return to aircraft 8. Second altitude measuring device 14 is, in embodiments, not a radar altitude measuring device. Second altitude measure device 14 operates independently of onboard radar altimetry. In one embodiment, second altitude measuring device 14 includes a Global Positioning System (GPS) or global navigation satellite system (GNSS) receiver and is configured to determine altitude based on global position data obtained from satellites, e.g. by trilateration with four or more satellites. In some embodiments, second altitude measuring device 14 is configured to determine altitude based on Wide Area Augmentation System (WAAS) or other augmented satellite-based global position data. A network of ground-based reference stations provide measurements of small variations in the GPS satellites' signals so that onboard GPS or GNSS receivers use the corrections while computing their positions to improve accuracy of second altitude data 42. In yet further embodiments, the second altitude measuring device 14 is a sonic altimeter or a pressure altimeter or is a combination of technologies described herein, optionally augmented by data from one or more inertial measurement units. In one embodiment, the second altitude measuring device is an instrument landing system that provides localizer and glide slope signals from which present position and altitude may be derived.

Terrain database 16 includes data elements describing ground terrain and some buildings. Thus, slopes, hills, mountains, buildings and even trees can be described in terrain database 16. Terrain database 16 allows terrain features to be included in displays generated by display system 32, particularly three-dimensional perspective displays provided by a primary flight display device (PFD) 50 of display system 32. Fault monitoring system 20, TAWS 34 and display system 32 are configured to receive terrain data 46.

In some embodiments, cockpit system 10 includes TAWS 34 for providing a safety net that automatically issues a distinctive warning to pilots when the aircraft 8 is, based on radar altitude data 40 and/or second altitude data 42 and terrain data 46, in potentially hazardous proximity to terrain. TAWS may issue a variety of outputs including Excessive Rates of Descent, Excessive Closure Rate to Terrain, Negative Climb Rate or Altitude Loss After Take-off, Flight Into Terrain When Not in Landing Configuration, Excessive downward deviation from an Instrument Landing System (ILS) glideslope, Localizer Performance and Vertical Guidance (LPV), or Global Navigation Satellite System (GNSS) Landing System (GLS) glidepath, and/or Voice callout "Five Hundred" when the airplane descends to 500 feet above the terrain or nearest runway elevation.

Display system 32 is configured, through program instructions 38, to use terrain data 46 from terrain database 16 to provide a terrain augmented visual display to a pilot. In one exemplary embodiment shown in FIG. 3, a synthetic vision display 100 is provided that includes terrain features 102 and graphical augmentations 104, 106, 108 such as highlighting of an approaching target runway 104, speed tape 106 (which is produced based on velocity included in aircraft data 48 from navigation system 18) and altitude tape 108 (which is produced based on altitude data 40, 42 from navigation system 18). Additional or alternative graphical augmentations are envisaged relating to aircraft data 48 from navigation system and a flight path from flight management system 30. Synthetic vision display 100 provides a synthetic, 3-D, view of an aircraft's flight path, the terrain ahead and the current navigational environment (e.g. including altitude, attitude and airspeed data from navigation system 18). Synthetic vision display 100 provides an animated view of the outside world that relies on terrain data 46 for terrain features 102. Synthetic vision display 100 may be provided on primary flight display 50, on a heads up display or some other display device. In accordance with various embodiments, display system 32 is configured to receive radar altitude data 40 as an input and to transform relative height between aircraft 8 and terrain in real space (using a combination of terrain data 46 and radar altitude data 40) into a relative height in image space using known techniques. In this way, relative height of aircraft and terrain can be visually depicted in displays, such as synthetic vision display 100, of display system 32. Whilst pilots should not use synthetic vision for primary navigation to avoid terrain or obstacles, faulty radar altitude data 40 could lead to visual artifacts and pilot confusion when viewing such displays. Accordingly, it is desirable to flag when radar altitude data 40 is potentially faulty, whilst avoiding over-flagging. The present disclosure addresses this goal by incorporating an adaptive fault condition threshold 52, as described further hereinbelow.

Fault monitoring system 20 includes an altitude difference calculation module 24 configured to determine, through program instructions 38, a difference between first altitude values derived from radar altitude data 40 and the second altitude values derived from second altitude data 42. Radar altitude data 40 provide radar altitude readings relative to terrain, whereas second altitude measuring device 14 generally provides altitude readings relative to sea level. In embodiments, radar altitude data 40 or second altitude data 42 is modified using terrain data 46 so that the altitude readings are both provided relative to sea level or relative to terrain under the aircraft 8. In one embodiment, radar altitude values are calculated to be in terms of sea level by adding terrain height (using terrain data 46). In another embodiment, second altitude values are calculated to be in terms of relative height of aircraft from terrain by subtracting terrain height (using terrain data 46). Having calculated altitude values based on radar altitude data 40 and second altitude data 42 to be with respect to a common reference plane, terrain altitude difference calculation module 24 is configured to calculate a difference therebetween to thereby provide difference data 54. Difference data 54 is representative of an error in radar altitude data 40 as indicated by comparison with second altitude data 42.

Fault monitoring system 20 includes a terrain fluctuation determination module 22 configured, through program instructions 38, to determine a terrain fluctuation metric 56 (or terrain fluctuation data 56). In some embodiments, terrain fluctuation metric 56 is determined based on aircraft data 48 including data representing aircraft location, aircraft speed and aircraft track or direction of travel and terrain data 46. Terrain fluctuation metric 56 is representative of a degree of fluctuation (elevation change in positive and negative directions) along a flight path (as determined by flight management system 30 or as determined based on aircraft track in aircraft data 48) of the aircraft 8 for a given forward distance. The forward distance is a window ahead of the aircraft 8 along the flight path. The forward distance may be a predetermined distance or an aircraft speed variable distance (and thus be calculated based on aircraft speed in aircraft data 48). In one embodiment, the forward distance is calculated based on a predetermined time ahead of the aircraft at the current aircraft speed. For example, 10 seconds ahead of the aircraft 8 at 200 kilometers per hour provides a forward distance of around 550 meters. The terrain fluctuation metric 56 can be determined by consulting terrain data 46 of terrain database 16 to determine a metric indicating elevation changes over the forward distance along a current heading of the aircraft 8. Elevation changes can be determined by adding an absolute value of the elevation changes. Alternatively, terrain elevation standard deviation may be calculated using known standard deviation calculation functions. Other suitable functions are envisaged for determining the terrain fluctuation metric 56.

It has been found that terrain fluctuation is one suitable guide as to situations when a fault condition threshold 52 should be adjusted. For example, highly fluctuating terrain may result in faulty radar altitude data 40. Additionally, flatter terrain may require a more sensitive fault condition threshold 52 than highly fluctuating terrain. Although the concepts described herein focus largely on using terrain fluctuation to adapt fault condition thresholds, terrain data is considered to be more generally useful as a basis for adapting fault condition thresholds. For example, different types of terrain (e.g. icy or rocky versus forestry or sandy terrains) may require more or less sensitive fault condition thresholds. Fault monitoring system 20 includes adaptive fault condition threshold determination module 26, which is configured to receive terrain fluctuation metric 56 or other terrain derived data and to adjust a fault condition threshold based thereon. In some embodiments, when the aircraft 8 is to follow a flight path for a specified distance over flatter or smoother terrains, then a lower (more sensitive) fault condition threshold is provided than for terrains that have higher (less sensitive) terrain changes. Adjustments may be made by a function that proportionally (and continually) varies a predetermined fault condition threshold based on the terrain fluctuation metric 56. Alternatively, ranges or bands of values for terrain fluctuation metric 56 may be defined that are respectively associated with different fault condition thresholds. Adaptive fault condition threshold determination module 26 is configured to output fault condition threshold 52.

Fault monitoring system 20 includes comparison module 27, which is configured, through program instructions 38, to receive difference data 54 and adaptive fault condition threshold 52 and to generate fault condition flag 44 when a difference between radar altitude values and second altitude values (as indicated by difference data) exceeds fault condition threshold 52. Since fault condition threshold 52 is determined adaptively based on terrain data 46, flag 44 will be issued more or less sensitively (i.e. requiring more or less difference between radar altitude readings and other altitude readings) depending upon terrain (e.g. depending upon terrain fluctuation).

Flag 44 is useable by various systems of cockpit system 10. In one example, display system 32 automatically, through program instructions 38, adjusts one or more of its display devices (e.g. PFD 50) when flag 44 indicates that radar altitude device 12 is exhibiting a fault condition. For example, in one embodiment, an output display of display system 32 may provide a textual or graphical warning of the fault condition. In an additional or alternative embodiment, display system 32 may remove radar altitude data 40 as an input in generating one or more displays (e.g. on PFD 50). Radar altitude data 40 may be removed as an input and replaced with second altitude data 42, which, although potentially less accurate, is possibly more reliable. In one example, synthetic vision display 100 (see FIG. 3) is generated by display system 32 using radar altitude data 40 when flag 44 is not set and without using radar altitude data 40 when flag 44 is set. Further, synthetic vision display 100 is optionally adapted to include a warning concerning the fault condition when flag 44 is set. In this way, visual artifacts as a result of using faulty radar altitude data 40 are not generated by display system because the radar altitude data 40 is discarded or replaced as an input in generating displays (e.g. synthetic vision display 100). Further, the pilot is visually warned, on the display itself, concerning potential reduced reliability of displays, particularly display that shows a perspective view of aircraft and terrain including relative height of aircraft and terrain. Cockpit system 10 may issue other warnings (e.g. audible) when flag 44 is set. TAWS may issue terrain avoidance and warning alerts when the flag 44 is set.

Figure 2:
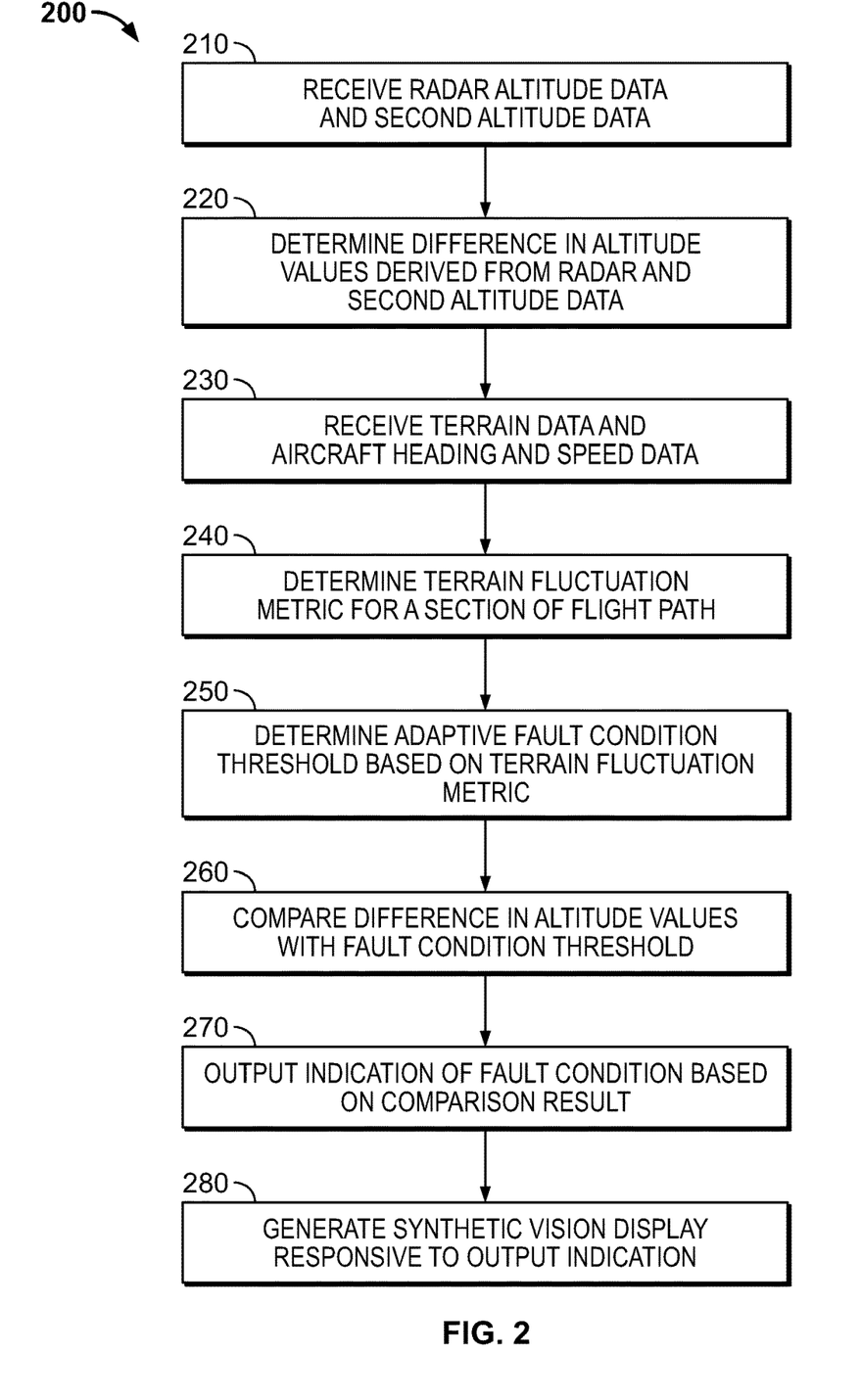
FIG. 2 illustrates a flowchart of a method of monitoring a fault condition, in accordance with various exemplary embodiments.

FIG. 2 illustrates a flowchart of a method 200 of monitoring a fault condition, in accordance with various exemplary embodiments. The various tasks performed in connection with method 200 may be performed by software (e.g. program instructions 38 executed by one or more processors 28), hardware, firmware, or any combination thereof. For illustrative purposes, the following description of method 200 may refer to elements mentioned above in connection with FIGS. 1 and 3. It should be appreciated that method 200 may include any number of additional or alternative tasks, the tasks shown in FIG. 2 need not be performed in the illustrated order, and method 200 may be incorporated into a more comprehensive procedure or process having additional functionality not described in detail herein. Moreover, one or more of the tasks shown in FIG. 2 could be omitted from an embodiment of the method 200 as long as the intended overall functionality remains intact.

Method 200 includes step 210 of receiving, at one or more processors 28 used by fault monitoring system 20, radar altitude data 40 from radar altitude device 12 and second altitude data from second altitude measuring device 42. Second altitude measuring device 42 includes a receiver of satellite global positioning data for a plurality of satellites, from which second altitude data 42 is derived.

Method 200 includes step 220 of calculating, by altitude difference calculation module, a difference between a first altitude value derived from the radar altitude data 40 and a second altitude value derived from the second altitude data 42, thereby generating difference data 54. The first and second altitude values are derived so as to be defined with respect to the same reference plane (e.g. height above terrain or height above sea level).

Method 200 further includes step 230 of receiving, at one or more processors 28 used by fault monitoring system 20, terrain data 46 from terrain database 16 and aircraft data 48 from navigation system 18. In step 240, terrain fluctuation metric 56 is determined, by terrain fluctuation determination module 22, for a section of flight path of aircraft 8. In some embodiments, section of flight path is positionally defined by track of aircraft 8 and current aircraft position included in aircraft data 48 and a length dimension of section of flight path is determined based on speed of aircraft included in aircraft data 48 such that larger sections are calculated for greater aircraft speeds. A linear section of flight path is drawn from current aircraft position in direction of aircraft travel for calculated length. In other embodiments, length of section of flight path is fixed or speed adaptive and position of section of flight path is derived from flight plan from flight management system 30 and current location of aircraft in aircraft data 48. Terrain data 46 is extracted from terrain database 16 corresponding to the flight path section and terrain fluctuation metric 56 is derived from the extracted terrain data 46.

Method 200 includes step 250 of determining, via the adaptive fault condition threshold determination module 26, a fault condition threshold 52 adaptively based on the terrain fluctuation metric 56. Fault condition threshold 52 may be adaptively determined based on a look-up table correlating terrain fluctuation metric values with fault condition threshold values or based on a mathematical function that adjusts a predetermined reference value for the fault condition threshold 52 using terrain fluctuation metric 56.

Method 200 includes step 260 of comparing, via comparison module 27, an altitude difference value represented in difference data 54 with adapted fault condition threshold 52. When the fault condition threshold 52 is breached, fault monitoring system 20 outputs a flag 44 indicating that the radar altitude device 12 is exhibiting the fault condition in step 270.

Figure 3:
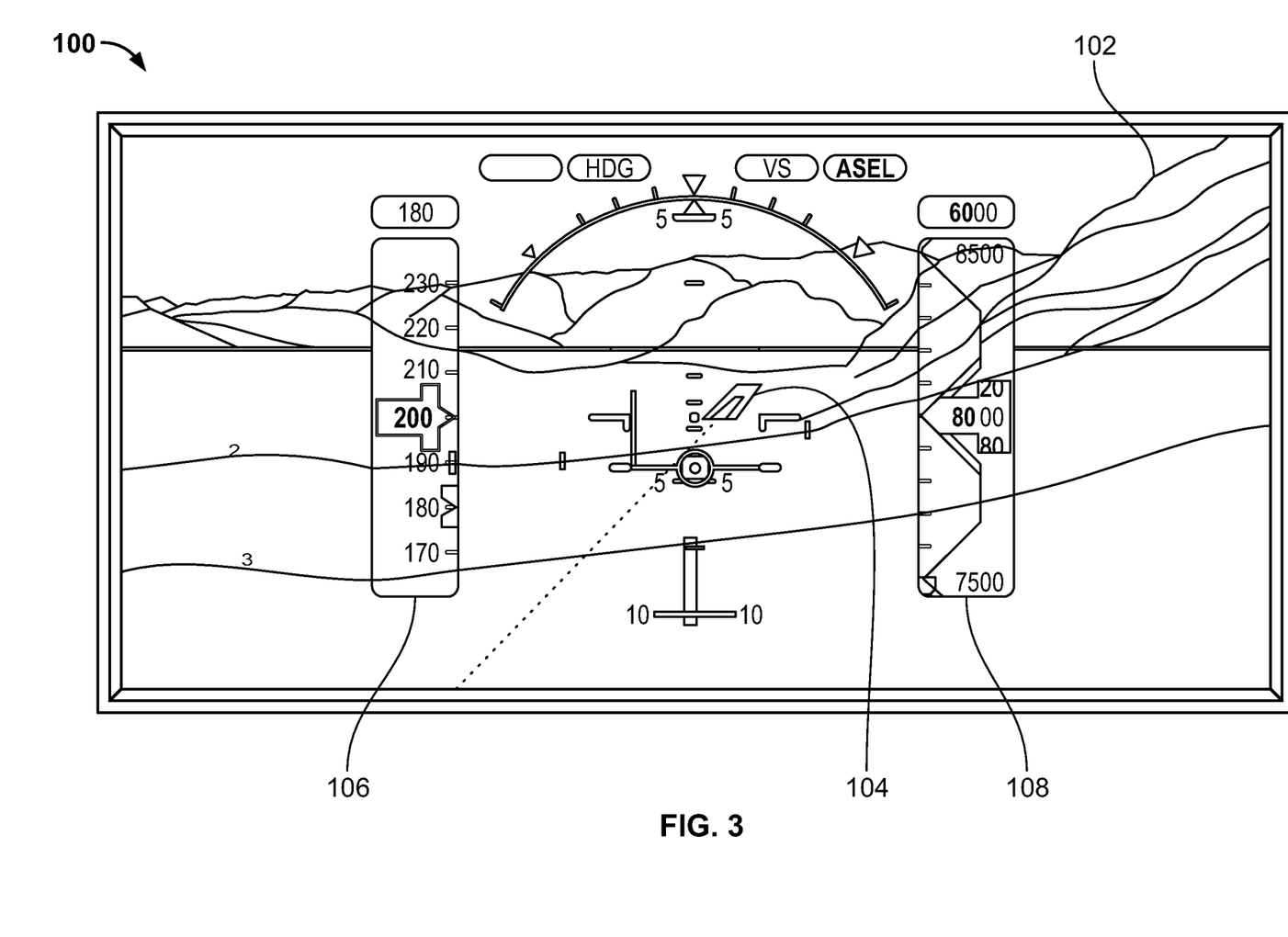
FIG. 3 is an exemplary output of a display system, in accordance with various exemplary embodiments.

Method 200 includes step 280 of outputting a synthetic vision display (e.g. such as display 100) that is responsive to flag 44. In embodiments, synthetic vision display 100 is generated based on terrain data 46 and radar altitude data 40 (when flag 44 is not set) so as to depict, on primary flight display 50, aircraft 8 position relative to height in three-dimensional perspective, animated environment. When flag 44 is set, synthetic vision display 100 includes a warning of potentially defective display and/or synthetic vision display 100 disables radar altitude data 40 as an input and replaces radar altitude data 40 with another source of altitude data, such as second altitude data 42. In this way, potentially confusing visual artifacts are removed when radar altitude data 40 is found to be defective. Further, because the fault condition threshold 52 is determined adaptively based on terrain data, frequency of synthetic vision display changes are optimized.

It should be appreciated that additional or alternative system reactions to flag 44 are possible such as outputting a warning through display system 32 and/or through another visual or audible alert of cockpit system. Further, whilst method 200 has specifically been described with respect to adjusting fault condition threshold 52 based on terrain fluctuation metric 56, other terrain parameters may be of use in adjusting fault condition threshold 52.

In some embodiments, program instructions 38 are configured to cause the at least one processor 28 to derive current phase of flight from flight management system 30 and to enable or disable monitoring the fault condition of the radar altitude device based on current phase of flight or to change rate of monitoring the fault condition of the radar altitude device 12 based on current phase of flight. This allows reduced processing and reduced possibility of nuisance alerts during less critical flight phases like cruise phase and focused processing during critical phases like approach and landing phase. The phase of flight information can be used to at minimum enable and disable fault monitoring system 20. When in cruise phase, there is possibly no need to trigger fault monitoring function. During takeoff phase, the altitude change of an aircraft is typically much faster than the landing phase, requiring the detection to be performed faster. As such, the phase of flight info can be one input for setting fault monitoring system 20.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft comprising:
a fault monitoring system for monitoring a fault condition of a radar altitude device;
the radar altitude device;
a second altitude monitoring device;
at least one processor configured to execute program instructions and in operable communication with the radar altitude device, the second altitude monitoring device and the fault monitoring system, wherein the program instructions are configured to cause the at least one processor to:
receive first altitude data from the radar altitude device;
receive second altitude data from the second altitude measuring device;
receive terrain data from a terrain database;
receive aircraft data including data representing aircraft location, aircraft direction of travel, and aircraft speed;
determine a window ahead of the aircraft along a flight path based on the aircraft data;
determine a terrain fluctuation metric representative of accumulated elevation change in positive and negative directions along the window ahead of the aircraft based on the terrain data;
adaptively determine a fault condition threshold based on the terrain fluctuation metric;
determine whether the radar altitude device is exhibiting a fault condition based on the first and second altitude data and the fault condition threshold; and
output an indication of the fault condition based on the determination of whether the radar altitude device is exhibiting the fault condition.

2. The aircraft of claim 1, wherein the program instructions are configured to cause the at least one processor to:
determine a first altitude value using the first altitude data;
determine a second altitude value using the second altitude data; and
determine whether the radar altitude device is exhibiting the fault condition based on a comparison of the fault condition threshold and a difference between the first altitude value and the second altitude value.

3. The aircraft of claim 1, wherein the fault condition threshold is increased as terrain fluctuatability increases and is decreased as terrain flattens, as derived from the terrain data.

4. The aircraft of claim 1, wherein the second altitude measuring device is configured to determine altitude based on positioning data obtained from satellites or a ground based guidance signal.

5. The aircraft of claim 1, wherein the program instructions are configured to cause the at least one processor to:
derive current phase of flight and to determine whether the radar altitude device is exhibiting a fault condition based additionally on the current phase of flight.

6. The aircraft of claim 1, wherein the program instructions are configured to cause the at least one processor to:
derive current phase of flight and to enable or disable monitoring the fault condition of the radar altitude device based on current phase of flight or to change rate of monitoring the fault condition of the radar altitude device based on current phase of flight.

7. A cockpit system in an aircraft, comprising:
a fault monitoring system for monitoring a fault condition of a radar altitude device;
the radar altitude device;
a second altitude measuring device; and
a synthetic vision system;
at least one processor configured to execute program instructions and in operable communication with the fault monitoring system, the radar altitude device, the second altitude device and the synthetic vision system, wherein the program instructions are configured to cause the at least one processor to:
receive first altitude data from the radar altitude device;
receive second altitude data from the second altitude measuring device;
receive terrain data from a terrain database;
receive aircraft data including data representing aircraft location, aircraft direction of travel, and aircraft speed;
determine a window ahead of the aircraft along a flight path based on the aircraft data;
determine a terrain fluctuation metric representative of accumulated elevation change in positive and negative directions along the window ahead of the aircraft based on the terrain data;
adaptively determine a fault condition threshold based on the terrain fluctuation metric;
determine whether the radar altitude device is exhibiting a fault condition based on the first and second altitude data and the fault condition threshold;
output an indication of the fault condition based on the determination of whether the radar altitude device is exhibiting the fault condition;
cause the synthetic vision system to generate a display based on the terrain data and the first altitude data as inputs to generating the display when the indication of the fault condition is that no fault condition is exhibited; and
cause removal of the first altitude data as one of the inputs to generating the display when the indication of the fault condition is that a fault condition is exhibited.

8. The cockpit system of claim 7, wherein the program instructions are configured to cause the at least one processor to:
determine a first altitude value using the first altitude data;
determine a second altitude value using the second altitude data; and
determine whether the radar altitude device is exhibiting the fault condition based on a comparison of the fault condition threshold and a difference between the first altitude value and the second altitude value.

9. The cockpit system of claim 7, wherein the fault condition threshold is increased as terrain fluctuatability increases and is decreased as terrain flattens, as derived from the terrain data.

10. The cockpit system of claim 7, wherein the second altitude measuring device is configured to determine altitude based on positioning data obtained from satellites.

11. A method of monitoring a fault condition of a radar altitude device and controlling a cockpit system of an aircraft, the method comprising:
receiving, via at least one processor, first altitude data from the radar altitude device;
receiving, via the at least one processor, second altitude data from a second altitude measuring device;
receiving, via the at least one processor, terrain data from a terrain database;
receiving, via the at least one processor, aircraft data including data representing aircraft location, aircraft direction of travel, and aircraft speed;
determining, via the at least one processor, a window ahead of the aircraft along a flight path based on the aircraft data;
determining, via the at least one processor, a terrain fluctuation metric representative of accumulated elevation change in positive and negative directions along the window ahead of the aircraft based on the terrain data;
adaptively determining, via the at least one processor, a fault condition threshold based on the terrain fluctuation metric;
determining, via the at least one processor, whether the radar altitude device is exhibiting a fault condition based on the first and second altitude data and the fault condition threshold;
outputting, via the at least one processor, an indication of the fault condition based on the determination of whether the radar altitude device is exhibiting the fault condition; and
responsive to the indication of the fault condition, controlling at least one cockpit system of an aircraft.

12. The method of claim 11, wherein the at least one cockpit system includes at least one of a synthetic vision system and a ground proximity warning system.

13. The method of claim 11, wherein the fault condition threshold is increased as terrain fluctuatability increases and is decreased as terrain flattens, as derived from the terrain data.

14. The method of claim 11, wherein the second altitude measuring device determines altitude based on positioning data obtained from satellites or a ground based guidance system.

* * * * *